US007108909B1

(12) United States Patent
Perlman et al.

(10) Patent No.: US 7,108,909 B1
(45) **Date of Patent: *Sep. 19, 2006**

(54) STRETCHABLE THERMOPLASTIC LABELS ON CRYOGENIC CONTAINERS

(75) Inventors: Daniel Perlman, Arlington, MA (US); Mark P. White, Arlington, MA (US)

(73) Assignee: Diversified Biotech, Inc., Boston, MA (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/904,699

(22) Filed: Nov. 23, 2004

(51) Int. Cl.
*B42D 15/00* (2006.01)
*B29D 22/00* (2006.01)
*B29D 23/00* (2006.01)
*B32B 1/08* (2006.01)

(52) U.S. Cl. ........................ 428/343; 428/35.7; 283/70; 283/81; 283/101

(58) Field of Classification Search .................. 283/70, 283/81, 67, 107, 117; 40/299; 128/DIG. 27; 220/901; 285/904; 428/35.7, 343
See application file for complete search history.

(56) References Cited

U.S. PATENT DOCUMENTS 4,211,741 A * 7/1980 Ostoich ................. 264/171.26
5,836,618 A 11/1998 Perlman ...................... 283/70

* cited by examiner

*Primary Examiner*—Michael Miggins
(74) *Attorney, Agent, or Firm*—Mark P. White

(57) ABSTRACT

A method for cryogenic specimen identification employs marking a stretchable pressure-sensitive vinyl label, and placing it on a storage vial or other container that can withstand a temperature of approximately −80 degrees C. or lower, preferably contact with the liquid and/or vapor phases of liquid nitrogen at a temperature of approximately −196 degrees C. The method includes providing a sized portion of the label that includes a waterproof soft flex vinyl facestock material containing a non-mobile plasticizer agent. The printing is also resistant to the moisture and ice that form on the container when it is removed from the liquid nitrogen. At room temperature, the label must be capable of being stretched without breaking at least 10% in both the MD and TD. Labels are sized, cut, the release liner is removed, and the label with its adhesive surface is applied to the container.

38 Claims, 3 Drawing Sheets

STRETCHABLE THERMOPLASTIC LABELS ON CRYOGENIC CONTAINERS

BACKGROUND OF THE INVENTION

This invention relates to the selection and use of certain pressure-sensitive adhesive-coated thermoplastic label materials for identification and marking of cryogenic vials and other containers subjected to very low temperatures More specifically, the invention relates to, and derives from the discovery that very ductile vinyl (PVC) labels can resist adhesive delamination and label edge peeling at cryogenic temperatures particularly if the PVC is plasticized with a non-mobile plasticizer, and the labels are oriented so that their more stretchable direction is oriented around the circumference of a cryogenic container.

Storage of perishable or unstable biological, chemical and industrial materials including tissue culture cells, tissues, embryos, sperm cells, eggs, chemicals, biochemicals and the like, at low and ultra-low temperatures, is referred to as cryogenic storage. For the purposes of this invention, cryogenic storage temperatures are defined as temperatures ranging downward from approximately −80 degrees C. to at least −196 degrees C. (the boiling point of liquid nitrogen), and are provided by special mechanical freezers and by special insulated Dewar chambers carrying liquid nitrogen. Temperatures as low as −270 degrees C. are provided by Dewar chambers holding liquid helium.

Tightly sealing cylindrical vials having gasketed sealing lids, are typically fabricated from thermoplastic materials such as polypropylene and polyethylene, and are commercially available for holding samples under cryogenic storage conditions. These vials are often essential for sample storage in liquid nitrogen at −196 degrees C., or at the same temperature in the vapor phase above liquid nitrogen. Microcentrifuge tubes (typically holding between 0.5 ml–2.5 ml liquid) formed from similar plastics, and having rounded or conical bottoms and tightly sealing screw cap or frictionally sealing hinged snap cap closures, are also used for cryogenic storage of samples. While it is possible to manually write on such round-surfaced vials and tubes and other cryogenic storage containers with permanent marking ink for purposes of sample identification, it is considerably easier to place a pre-marked or pre-printed label on such a container.

U.S. Pat. No. 5,836,618 by Perlman, describes non-vinyl pressure-sensitive container labels capable of withstanding cryogenic storage conditions. Perlman also describes prior art label materials for cryogenic containers, including woven and non-woven fiber and cloth tapes, and a hand-markable vinyl label that could not retain computer-directed printing (such as ink-jet or laser printing). That prior art vinyl label (corresponding to product number 7604FP manufactured by the 3M Company, St. Paul, Minn., and previously advertised and sold by Diversified Biotech, Boston, Mass.) had limited utility because it was not machine-printable and was also susceptible to partial peeling on low surface energy, curved surface plastic vials such as polypropylene microcentrifuge tubes that were exposed to liquid nitrogen. Peeling of 7604FP labels was more problematic with age, and may have resulted from the combination of vinyl plasticizer and adhesive used in this product. Examples of the other previously available cryo-label materials include cloth Cryoware™ labels from the Nalge Company (Rochester, N.Y.) and “high/low temperature” cloth tape #314 from TimeMed Labeling Systems, Inc. (Burr Ridge, Ill.). Also, “Clear Tape” that is produced by Bel-Art Products (Pequannock, N.J.) is not actually a label, but is a clear overcoating tape to protect labels, and can withstand liquid nitrogen exposure.

U.S. Pat. No. 5,836,618 by Perlman is relevant background to the present invention, and is incorporated herein by reference in its entirety. Perlman describes a number of non-polyvinyl, i.e., non-PVC-based stretchable cryogenic labels in which the facestock materials could be stretched, i.e., elongated prior to breakage, at least 10% in both the machine direction (abbreviated MD) and the transverse direction (abbreviated TD) of the facestock without breaking. Standard methods for testing labels for such percentages of elongation prior to breakage, e.g., ASTM D-882A, are described in American Standard Testing Method (ASTM) manuals.

In contrast to the ASTM test, a simplified method was utilized for testing the extent of stretch during the period of initial research for U.S. Pat. No. 5,836,618, employing narrow strips of label material (approximately ⅛ inch in width and 6–8 inches in length cut in either the MD or the TD) that were ruled off in ¼ inch intervals. Applicant gradually pulled on these strips using both hands until the label broke. The maximum percentage increase in length among the ruled intervals was recorded.

As part of the research for U.S. Pat. No. 5,836,618, and thereafter, Applicant tested a number of facestock materials that were found suitable for use in fabricating laser-printable, ink jet and thermal transfer-printable cryogenic container labels according to the teaching of this invention. These facestock materials include polypropylene, polyethylene, polyester and various blended facestock materials that even include thermoplastics blended with mineral materials, e.g., Teslin® (a porous composite facestock material containing high density polyethylene combined with silica manufactured by PPG Industries, Pittsburgh, Pa.). Another blended facestock material formerly known as Kimdura® and now known as Yupo® synthetic paper (a combination of polypropylene and calcium carbonate manufactured by the Yupo Corporation of America, Chesapeake, Va.) is also available for such purposes.

More recently, improved PVC labels have been developed that are machine-printable and, in fact, laser-printable. In addition to adding a suitable topcoat to the vinyl so that it retains laser toner, other technical obstacles have been overcome to permit laser printing. For example, laser printer fuser rollers are heated to about 350–400° F. Since PVC begins to melt at only about 160° F., the label must travel quickly and smoothly over the fuser rollers to prevent the PVC from melting (the fuser rollers fuse the laser toner image to the topcoat of the label). Accordingly, the topcoat must be free of any stickiness when it is heated to the temperature of the fuser rollers so that the label stock will not hesitate and melt. Only certain topcoatings are compatible with such high temperatures, and these topcoatings will help dissipate the heat at the surface of the label, while also bonding the laser toner. In addition, a heavier (typically 60–85 pound) paper release liner is often used to support the adhesive-coated (and somewhat softened) label stock. This provides a frictional outer surface that helps feed the label smoothly through the transport rollers without slippage.

Until Applicant conducted research for the present invention using multiple industrial sources of PVC facestocks, vinyl labels were considered unsuitable for use as printable cryogenic container labels. First, a previously developed vinyl cryo-label (3M 7604 FP) could only be manually marked, and had limited utility as a cryo-label due to peeling (see above) particularly as the label aged. In addition, a laser-printable vinyl label material that was recently fabricated for Applicant showed substantial peeling on cryogenic containers when exposed to liquid nitrogen (see Example 1 below). In fact, the importance of using a soft (e.g., highly plasticized) and highly ductile vinyl facestock containing substantially immobilized plasticizer was not appreciated prior to the present invention. Furthermore, the asymmetric stretching properties of certain oriented, e.g., biaxially oriented, vinyl facestocks, and the importance of selecting the facestock orientation in the die-cutting, and placement of such facestocks on cryogenic containers in order to prevent the labels from peeling when exposed to cryogenic temperatures was not appreciated prior to the present invention.

SUMMARY OF THE INVENTION

It is an object of the present invention to provide a method for marking laboratory equipment with labels which will survive cryogenic conditions. It s a further object of this invention to provide such marking methods using commercially available labels, not yet understood to be suitable for such purposes.

In accordance with one aspect of the invention, a method of labeling a cryogenic specimen storage container prior to storage at a cryogenic temperature of about −80 degrees C. or lower, includes the steps of providing a sized portion of an adhesive vinyl label which is a waterproof, soft flex vinyl facestock material having a waterproof machine-printable upper surface, and a waterproof pressure-sensitive adhesive-coated lower surface.

In accordance with a second aspect of the invention, the vinyl facestock material includes a substantially non-mobile plasticizer agent, and the material is capable of being stretched at room temperature at least 10% in both the machine and transverse directions without breaking when subjected to a tensile stress of less than 1200 psi.

In accordance with a third aspect of the invention the upper surface is marked to identify the container, the marking resistant to ice and moisture that typically condense on the container when it is transferred from cryogenic storage conditions to ambient conditions.

In accordance with a fourth aspect of the invention the label is attached to the container.

In accordance with a fifth aspect of the invention the label is vinyl, having significant elongation asymmetry between the MD and the TD.

In accordance with a sixth aspect of the invention the label is first oriented on the container before attaching, so that the stretchable direction of the label is oriented in approximately the same direction as the circumference.

In accordance with a seventh aspect of the invention the cryogenic storage conditions include temperatures at the liquid or vapor phase of liquid nitrogen.

In accordance with an eighth aspect of the invention the label has a calendered facestock In accordance with a ninth aspect of the invention material the label has a cast facestock material.

In accordance with a tenth aspect of the invention the vinyl facestock material contains one or more polymeric plasticizer agents that will not significantly migrate from said facestock material into the adhesive-coated lower surface of the label.

In accordance with an eleventh aspect of the invention the vinyl facestock material is a soft flex vinyl material.

In accordance with a twelfth aspect of the invention the facestock material is capable of being stretched at room temperature at least 25% in the machine and transverse directions before breaking when a tensile stress of less than 1200 psi is applied.

In accordance with a thirteenth aspect of the invention the facestock material is capable of being stretched at room temperature at least 50% in the machine and transverse directions before breaking when a tensile stress of less than 1200 psi is applied.

In accordance with a fourteenth aspect of the invention the upper surface of the facestock material is coated with a top coating material that is receptive to, and retains waterproof markings.

In accordance with a fifteenth aspect of the invention the facestock material is between approximately 0.001 inches and 0.010 inches in thickness.

In accordance with a sixteenth aspect of the invention the adhesive coating on said lower surface of the facestock material is either acrylic and rubber-based adhesives.

In accordance with a seventeenth aspect of the invention the adhesive coating is between approximately 0.0005 inches and 0.005 inches in thickness.

In accordance with an eighteenth aspect of the invention the marking of said upper surface of the facestock material is accomplished by a laser printer.

In accordance with a nineteenth aspect of the invention the marking of said upper surface of the facestock material is accomplished by a permanent ink marker, pencil, or ballpoint pen In accordance with a twentieth aspect of the invention the marking of said upper surface of the facestock material is accomplished by a direct thermal printer.

In accordance with a twenty-first aspect of the invention the marking of said upper surface of the facestock material is accomplished by a thermal transfer printer.

In accordance with a twenty-second aspect of the invention the marking of said upper surface of the facestock material is accomplished by an ink jet printer.

In accordance with a twenty-third aspect of the invention the facestock material is capable of being stretched at room temperature at least 10% in both the machine and transverse directions without breaking when the pressure sensitive adhesive is capable of transferring a tensile force of at least 4 lbs. to the facestock.

BRIEF DESCRIPTION OF DRAWINGS

This invention itself, both as to its organization and manner of operation, together with further objects and advantages thereof, may be best understood by reference to the following description taken in connection with the accompanying drawings in which.

Figure 1:
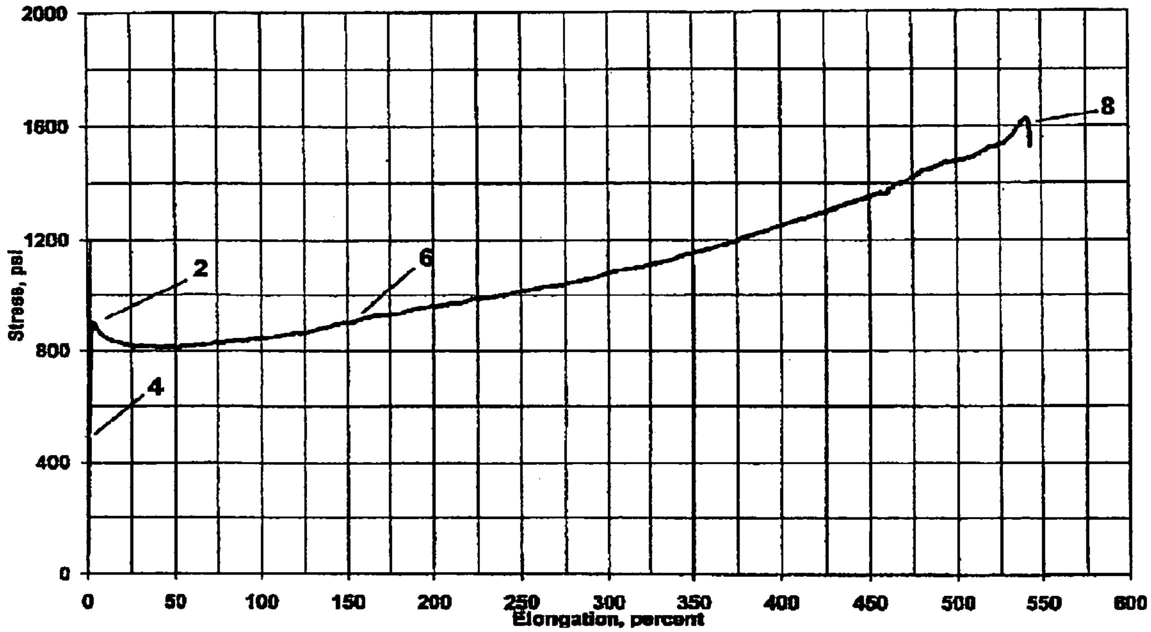
Fig. 1 (Prior Art)
FIG. 1 is a graphical depiction of stress versus strain for the "Cryobaby" labels sold by Diversified Biotech, Inc.

Appendix A is a tutorial description of the basics of pressure-sensitive labels, produced by the Association for Automatic Identification and Mobility, and which may be found at:

http://www.aimglobal.org/technologies/consumables/consumables basics.htm

Definitions

For the purpose of better understanding technical descriptions and the claims in the present invention, the following terms and phrases used herein shall have the following meanings.

The term "label" as used herein is mean to refer to the pressure sensitive label as described in Appendix A attached hereto.

The term "identifying" as used herein is meant to include any process or means of marking a container, or label affixed thereto which produces a pattern such alphanumeric, graphic, or any other pattern that is visible or readable by the human eye or by any other detection device including, inter alia, automated scanner or bar code reader.

The term "marking" as used herein in meant to include any means for producing said pattern on the container or label affixed thereto, including, inter alia, pen, pencil, stamp, impact printer, thermal transfer printer, laser printer, and ink-jet printer.

The term "cryogenic specimen storage vial" is meant to include the terms cryovial, cryo-container, cryogenic tube, and the like, including any and all closed, sealed, or re-closable containers (e.g., with screw caps or frictionally sealing snap caps) in which the container can be safely and securely stored at cryogenic temperatures (meaning at −80 degrees C. or below, and preferably submerged in liquid nitrogen or suspended in the vapor phase above liquid nitrogen at a temperature of approximately −196 degrees C.). Capped or lidded microcentrifuge tubes and cryovials commonly fabricated from polyethylene or polypropylene (see Fisher Scientific Catalog 04/05 pages 308–313 and pages 389–398) are often used as cryogenic specimen storage vials.

The term "adhesive" as used herein refers to the type of adhesive described in Appendix A attached hereto. Pressure-sensitive adhesives bond on contact and the bonding strength increases with increased pressure and/or time. These adhesives as used in labels are typically based upon either rubber or acrylic chemistries, and are generally applied by means of lamination, in which a solvent-borne or an aqueous liquid-borne adhesive is initially coated onto the "release liner" Following removal of the solvent or water, the adhesive is laminated to the lower surface of the label's facestock.

The term "vinyl" refers to the polyvinylchloride or PVC chemical make-up of the facestock of the label. PVC is essentially inert, non-porous and non-absorbent with regard to water, i.e., waterproof. By itself, PVC will not absorb or retain most machine-printable inks, although it is easily hand-markable using a solvent-borne permanent marker ink. Machine-printing of PVC requires that the upper surface of the PVC facestock be "top coated", i.e., over coated, with an ink-retaining coating. Many different proprietary topcoatings have been developed for PVC facestocks. Some are uniquely engineered to selectively retain a single type of printing such as laser toner, while other topcoatings may retain two or more different types of printing, e.g., wax thermal transfer printing as well as laser printing.

The term "significant elongation asymmetry" is defined in detail hereinabove. In brief, it means at least a 1.25-fold greater elongation before breakage for one direction of the label versus the other, i.e., either MD elongation greater than TD or TD elongation greater than MD.

The term "waterproof" as it refers to the upper surface and the adhesive-coated lower surface of the label means that neither of these surfaces will react, or be permanently affected by contact with water. While water residues may interfere with printing or with initial bonding of a label to a substrate (or to a cryovial), water can be removed by drying, and bonding or printing will still be effective. Once a label has been printed and attached to a cryovial, the waterproof label is substantially unaffected by submersion in water at ambient temperature.

The term "stretch" and "extent of stretching" as used herein is a measure of ductility and is interchangeable with the terms "elongate" and "percentage elongation before breakage measured at room temperature with an Instron universal testing machine using a 1"×6" strip of label according to the ASTM D882 testing method. The percentage elongation is calculated from the increase in length of the sample label when the tensile stress applied is under 1200 psi, for reasons described further in these applications. Specimens are placed in the grips of the Instron and pulled until rupture, and the increased distance separating the grip jaws is measured, as described in the attached Appendix. This increase in length is divided by the original length of the thermoplastic label to provide a percentage elongation.

The terms "machine direction" (MD) and the "transverse (or cross) direction" (TD or CD) refer, respectively, to the direction in which the facestock and label are manufactured, rolled and spooled (the MD) versus the direction orthogonal to the machine direction (i.e., the TD or CD). The more stretchable direction may be either the MD or the TD depending upon the method of manufacture of the label material.

The terms "calendered" and "cast" as used herein refer to different methods of manufacturing vinyl (PVC) facestocks, i.e., films. These methods are described hereinabove.

The terms "substantially non-mobile" or "sufficiently non-mobile" refer to a plasticizer agent and more particularly to improved slow-to-diffuse plasticizer agents (typically high molecular-weight branched polymeric plasticizer agents) rather than so-called monomeric plasticizers that are considered mobile plasticizers. Plasticizers as used herein are chemical agents, often liquids, that are combined with PVC resins and used to soften the resulting PVC films. This term is further understood to mean that the plasticizer agent will not significantly migrate from the PVC facestock into the adhesive coating.

The term "significant migration" is functionally defined as migration of a plasticizer agent from the vinyl facestock into the adhesive that is sufficient to cause peeling of the label from a cryo-container during or after cryogenic storage as a result of weakening in the adhesive bonding of the label to the container.

The terms "soft" and "flex" refer to vinyl (PVC) films or facestocks used in fabricating labels having soft hand-feel and high ductility and elongation. For the purposes of the present invention, they are terms describing vinyls that have been sufficiently softened (e.g., by addition of sufficient amounts of plasticizers, see text hereinabove) to adequately elongate to remain attached to a cryovial when the vial and label are subjected to cryogenic storage conditions.

The term "orienting and attaching" referring to the label being attached and adhered to the container, e.g., a cylindrical cryovial, refers to choosing either the MD or the TD for alignment in the direction of the circumference of the cryovial. For cryogenic containers that do not have cylindrical cross-sections, e.g., square vials with rounded edges, the MD or the TD of a label may be aligned around the perimeter of the vial, in which a label may be adhered to more than one face of the vial.

The term "facestock material" refers to the principal structural core of a pressure-sensitive adhesive label, e.g., a plastic film. In the present invention, a vinyl facestock receives a pressure-sensitive adhesive coating on its lower surface and a machine-printable top coating on its upper surface.

The term "topcoat" or "top coating" refers to an ink-, resin-, wax-, toner- or other print-retaining surface coating that is applied to the upper surface of the facestock of the label. In the case of an impermeable vinyl facestock film, the topcoat is important for anchoring any markings or printing (also termed "marking media") to the facestock.

The term "programmable" as used in the context of machine printers (e.g., ink jet, laser, thermal transfer and direct thermal printers) indicates that the laboratory worker or other end-user of the printable labels can generate variable identifying information or markings on the labels to uniquely identify a cryogenic sample.

Stretch and Strain in Thermoplastics

The term stretch when used in respect to thermoplastic films defines the amount that a sample will elongate when subjected to certain types of tensile stress. The amount of elongation is a function of the tensile stress applied, and varies constantly as function of stress. As a result, the term stretch or elongation has a specific meaning only in response to a particular stress applied.

Referring now to FIG. 1, a stress versus strain plot is shown reflecting the characteristics of label sold under the name "Cryobabies", P/N LCRY2380, sold by Diversified Biotech, Inc. of Boston, Mass. This label is a polyolefin material, which has been determined to be suitable for use in cryogenic environments.

The plot was obtained by performing a test on a sample label using the test procedures described in ASTM D 882-02. Referring now to this figure, as the stress increases from zero, the strain (elongation) increases only slightly, up to a stress of about 900 psi. The curve in this region 4 is linear, with a very steep slope. The region is referred to as the Hook's Law region, where strain is a linear function of stress, and where the material will return to its original shape when the stress is removed.

When the stress exceeds 900 psi, however, the material is said to exceed its elastic limit 2, and the curve changes to a very gentle slope, indicating that in this non-Hook's Law region 6 only a small stress is required to cause a significant elongation. For instance, to cause elongation in this region to increase from 50% to 150% only a 100 psi increase in stress is required.

It is further noted that in this non-Hook's Law region elongation is not recoverable; that is, when the stress is reduced the elongation already produced does not decrease.

Finally, when the stress is increased to about 1600 psi the material reaches its failure point 8, at which it ruptures.

The "Cryobaby" labels are sold in 0.5 inch width sizes, having a thickness of 0.007 inches. At a stress of 1000 psi, the tensile force on the label is 1000*0.5*0.007, or 3.5 lb. Thus, in accordance with FIG. 1, a stress of 1000 psi, or 3.5 lbs, will cause the label to elongate, non-elastically, by 250 percent. According to FIG. 1, a force of 900 psi, or 3.15 lbs, will cause the label to reach its elastic limit, and then expand to about 150% without further application of tension on the label.

It is disclosed, according to the U.S. Pat. No. 5,836,618 patent of co-inventor Daniel Perlman, that the ability to expand, or elongate, more than 10% will make the label suitable for use under cryogenic conditions. The previous discussion demonstrates that only about 3 lbs. of tension are necessary to cause the label to stretch this amount. This amount of tension must be supported by the adhesive which attaches the label facestock to the underlying laboratory vessels.

Figure 2:
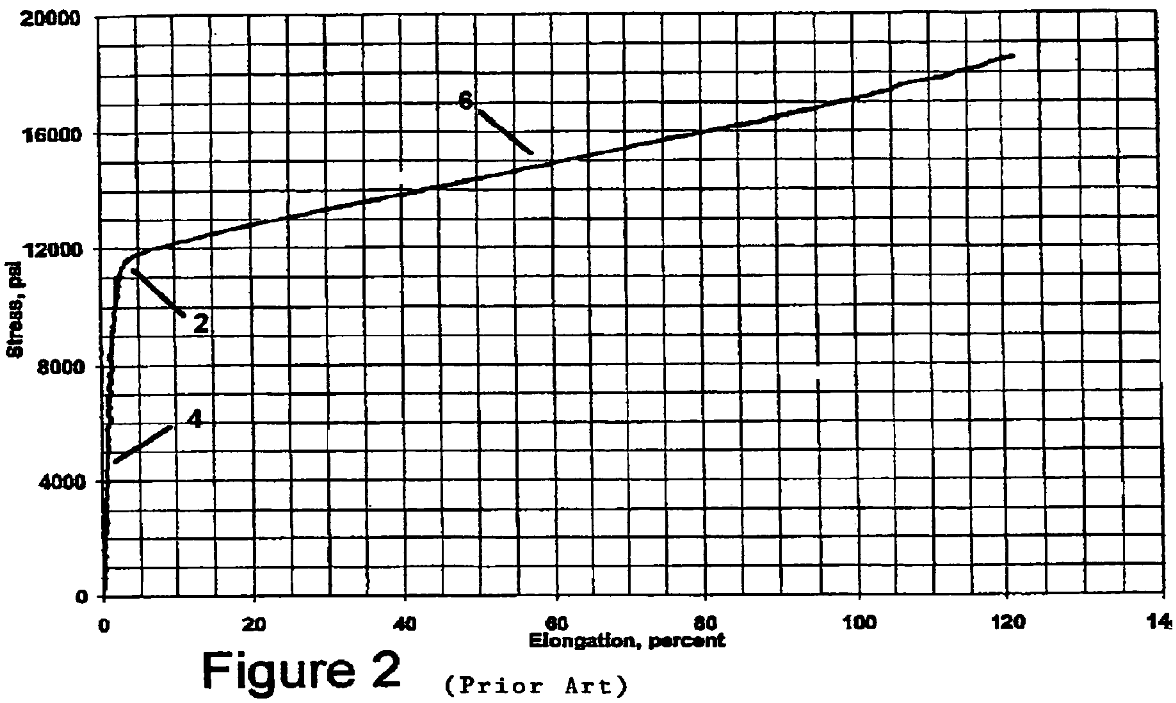
Figure 2 (Prior Art)
FIG. 2 is a graphical depiction of stress versus strain for the "7880" labels sold by 3M Corp.

In comparison, consider next FIG. 2, which discloses similar stress-strain characteristics of another label, in this case, P/N 7880, sold by 3M Corporation. The label of FIG. 2 is a polyester label, found to be ineffective under cryogenic conditions.

Still referring to FIG. 2, the Hook's law region 4 obtains up to a stress of about 11,000 psi, and elongation of 10% is reached only when the strain, or tensile force, reaches about 12,000 psi.

The 7880 labels are 2.3 mills thick, according to the manufacturer's data sheet, so that a ½-inch label has a cross section of 0.0023*0.5, or 0.00165 sq. in. The tension required to cause this degree of elongation is thus calculated as 12,000*0.00165, or 13.8 lbs.

Thus, the 3M 7880 label requires five times the tensile force as the Cryobaby labels. The adhesive in these labels appears to have insufficient strength to transmit this amount of tensile stress to the label required to stretch the label by the required 10%.

Figure 3A:
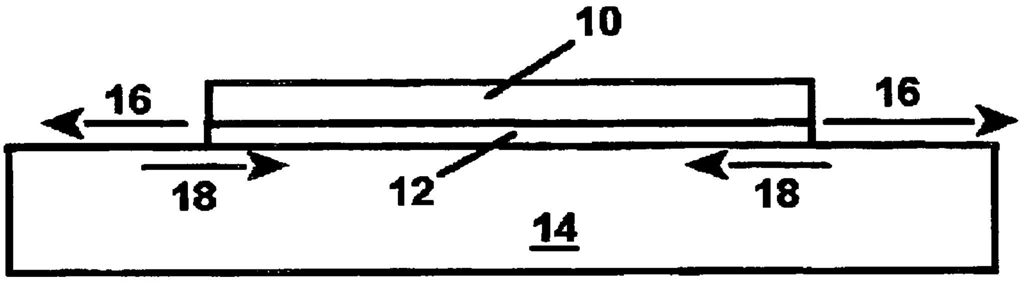
FIG. 3*a* depicts a cross-section view of a pressure sensitive label attached to a surface, showing stress lines on the various components.

The physics of the situation can be made clear from referring now to FIG. 3A. A label facestock 10 sits atop a layer of adhesive 12, which, in turn, is affixed to a surface 14 representing a laboratory container.

In order to stretch the facestock 10, tensile forces 16 must be exerted on the facestock by means of the adhesive 12. Equal and opposite compressive forces 18 must be exerted on the adhesive by the surface of the container 14; otherwise the label would move relative to the surface. Such equal and opposite forces on the adhesive are know as shear forces, and the adhesive must have sufficient strength to tolerate these shear forces without failing.

It is clear that in the case of the Cryobaby polyolefin label the shear strength of the adhesive is sufficient to transmit the required 3 lbs of tensile stress. The 3M 7880 polyester label, in contrast, cannot transmit the required 13.8 lbs to provide the required 10% stretch, and so the label fails for cryogenic purposes.

These labels are generally tested by the manufacturers to test the strength of their adhesives. In that case the "peel" strength of the adhesive is tested. The "peel" strength measures the resistance of the adhesive to "peeling" the label off various types of surfaces. In the case of the 3M 7880 label, the peel strength for a polypropylene surface is between 50 and 54 oz/inch. For a ½-inch wide label, this results in strength of between 25 and 27 oz., or between 1.56 or 1.69 lbs.

Figure 3B:
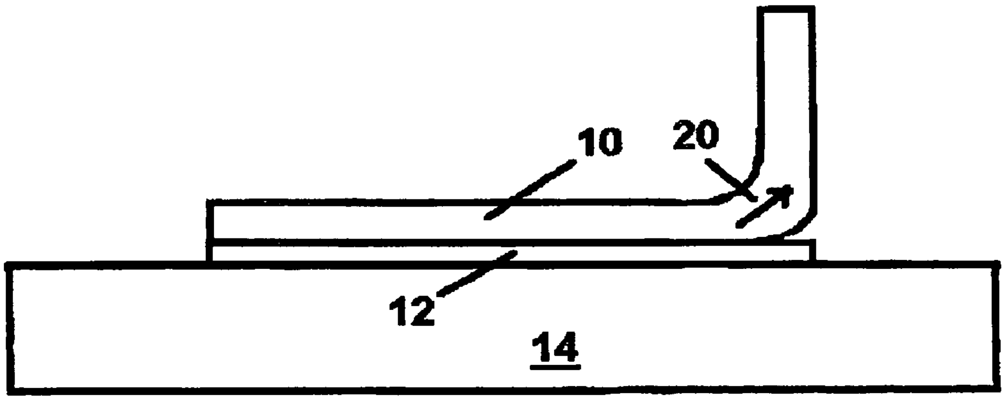
FIG. 3*b* depicts a cross-section view of a pressure sensitive label being peeled from a surface, showing stress lines on the various components.
Figure 3C:
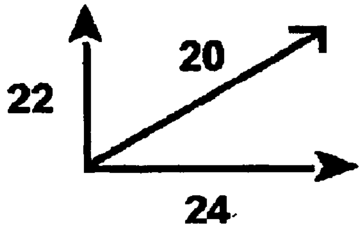
FIG. 3*c* depicts the stress line of FIG. 3*b*, decomposed into its vertical and horizontal components.

The peel strength is no identical to shear strength, but it is closely related. Referring not to FIG. 3*b*, it is seen that as a label is peeled off a surface, the forces on the label facestock 10 and surface 14 are at an angle to the surface where the label separates from the surface as indicated by reference number 20. Referring now to FIG. 3*c*, this angular force 20 may be resolved into a force 22 perpendicular to the surface, a tensile force, and a force 24 parallel to the surface, which is a shear force.

As a practical matter, it has been found that to be suitable for use in a cryogenic environment, the label must be able to stretch an additional 10% when less than 4 lbs of force are exerted on the label, using an adhesive with peel strength of less than 2 lbs. It has further been found that a label requiring about 14 lbs of force to stretch the required 10% are not suitable, using an adhesive of about the same strength.

The result may be restated in another way: namely, that using the most common adhesives currently available for such labels, labels capable of stretching the required 10% with less that 1000 psi tensile stress are suitable for use under cryogenic conditions, and those requiring greater that 12,000 psi tensile stress for 10% elongation are not.

As used in this application, the term stretch will be used to mean the maximum elongation resulting when a tensile stress of less than 1200 psi is applied

Preferred Embodiments

This invention features a method for identifying and tracking cryogenic specimens, employing printing or otherwise marking a machine-printable adhesive-coated vinyl label and placing it on a storage vial or other container that can withstand cryogenic temperatures at least as low as −80 degrees C., and preferably contact with the liquid and/or vapor phases of liquid nitrogen at a temperature of approximately −196 degrees C. The method includes the steps of providing a sized portion of a stretchable adhesive-coated label that includes a waterproof vinyl (PVC) facestock material with a print-retaining waterproof upper surface, e.g., a waterproof top coating, and a waterproof pressure-sensitive adhesive-coated lower surface. The printing is also resistant to any moisture and ice that forms on the container when it is removed from the liquid nitrogen.

The PVC facestock material used in the present invention must be highly ductile, and is usually known in the art as “soft” or “flex” or “soft flex” vinyl film or facestock. At room temperature, the label must be capable of being stretched without breaking at least 10%, and preferably 15%, 25%, 50% or more, in both the MD and TD. A soft flex vinyl is manufactured by including a sufficient amount of a suitable, i.e., substantially non-mobile, plasticizer to increase the conformability, i.e., compliance, of the resin used to form the facestock. Currently, a soft flex vinyl facestock that is useful in the present invention is made by combining as much as 40 pounds of a non-mobile polymeric plasticizer agent with one hundred pounds of PVC resin. Successively lower amounts of plasticizer (e.g., 20 pounds per hundred pounds PVC) may be used to produce so-called “firm” and “rigid” vinyls, but these vinyls tend to function poorly as facestocks at cryogenic temperatures. Over the years, PVC plasticizers have varied widely, ranging from rather simple, so-called monomeric plasticizers like vegetable oil, to high molecular weight, so-called polymeric plasticizers. For use in the present invention, and as long as plasticizers continue to be required in PVC films to achieve sufficient ductility for cryogenic use of the PVC, it is a requirement that the PVC resin contain a substantially non-mobile plasticizer (typically a polymeric plasticizer such as liquid polyester, e.g., polyester adipate) that will not significantly migrate from the PVC facestock into the adhesive coating. “Significant migration” is defined functionally as sufficient movement of the plasticizer to weaken the adhesive enough to cause peeling (partial or total) of the label during or after cryogenic storage. Expressed another way, while soft flex vinyl facestocks containing mobile plasticizers (and coated with pressure-sensitive adhesives) may retain adequate adhesion to cryovials and other containers at ambient or even regular freezer temperatures, e.g., −20° C., these facestocks require non-mobile plasticizers to prevent peeling of such labels from cryovials at cryogenic temperatures. Accordingly, a substantially non-mobile plasticizer agent(s), e.g. polymeric plasticizers, should be used in the labels of the present invention rather than monomeric plasticizers.

Highly ductile PVC facestocks or films are required for use in the present invention, and are manufactured by either casting or calendering. The former method tends to be more costly, and involves casting a liquid organosol PVC coating, evaporating a solvent, and baking. Little mechanical stress is produced during casting of a PVC film so that the PVC polymer molecules are not significantly aligned in either the MD or the TD. The resulting films tend to be similarly ductile in the MD and the TD, although applied forces may be used to stretch the material and partially align the PVC molecules. Calendered films, on the other hand are less expensive, and are produced by heating and compressing the PVC through nip rollers to make a thin film, and this process tends to align or stretch the PVC molecules in the MD. These calendered films may additionally be stretched in the TD to produce biaxially oriented PVC films. Typically, but not exclusively, PVC facestocks used in the present invention are manufactured by the calendering process, and therefore the PVC molecules tend to be aligned more in one direction (either the MD or TD) than the other during manufacture. Consequently, these films or facestocks and the final pressure-sensitive labels tend to have greater ductility (show greater elongation before breakage) in either the MD or the TD. In the present invention, particularly with labels made using calendered PVC facestocks, the labels are laid out and cut (e.g., die-cut) with this property in mind. That is, the labels are laid out relative to the MD and TD of the vinyl film so that the labels can be applied to the container with the more stretchable direction of the label oriented around the circumference (or perimeter) of a cryocontainer. Empirically, and for reasons still remaining to be fully understood, this orientation has been found to reduce the extent of peeling of the vinyl labels from a container after contact with liquid nitrogen. To greater or lesser degrees, orienting other types of plastic labels (non-vinyl thermoplastic facestocks) on cryovials using similar elongation tests (MD versus TD elongation before breakage) to determine the preferred orientation of the label on the container can help reduce label peeling from cryovials.

If a vinyl label (i.e., a label having a PVC facestock) possesses “significant elongation asymmetry,” it can be selectively and beneficially oriented on a cryogenic container according to the teaching of the present invention. The term “elongation asymmetry” means that the label can be elongated to a greater extent (e.g., using the ASTM D882 testing method) either in the MD or the TD before it breaks. The term “significant elongation asymmetry” means at least a 1.25-fold asymmetry, and preferably 1.5-fold. Most preferably, the term significant means a 2-fold or greater elongation asymmetry for one direction (either the MD or the TD) versus the other. By way of example, if a 4 inch vinyl label sample placed between the jaws of an Instron elongation measuring device can be stretched to 9 inches (5/4 or 125% elongation) in the TD but only 8 inches (100% elongation) in the MD, then the elongation asymmetry=125/100=1.25. That asymmetry qualifies as significant. In Example 2 below, a vinyl label (tested by Emtech Emulsion Technologies, Inc., Medina, Ohio) could be elongated 178% in the TD and 76% in the MD before breaking, for an elongation asymmetry of 2.3-fold.

In general terms, the present invention provides a method for identifying, tracking and archiving samples stored at cryogenic temperatures in cryovials, e.g., polyethylene, polypropylene or glass cryovials, and other suitable containers using certain waterproof, printable thermoplastic vinyl label materials with pressure-sensitive adhesives. More specifically, the invention relates to the discovery that labels fabricated using certain vinyl facestock materials with suitable top coatings and pressure-sensitive adhesives (as well as labels fabricated using certain other stretchable thermoplastic facestock materials) can resist adhesive delamination and edge peeling following exposure to cryogenic temperatures provided that the label is applied to the container with its direction of greatest elongation or stretch, oriented around the circumference or perimeter of a typical cylindrical cryovial container (rather than along the vertical side of the vial parallel to the container's axis).

EXAMPLE 1

Laser-Printable Vinyl Label that Fails Cryogenic Test

Surprisingly, some vinyl labels that exhibit substantial elongation before breakage at room temperature may still peel away from cryovials following immersion in liquid nitrogen regardless of the orientation of the label on the vials. For example, a 0.006 inch thick semi-transparent vinyl label sheet consisting of a 4 mil vinyl facestock with a laser-printable topcoat, and a 2 mil permanent acrylic adhesive (designated V-606) was fabricated for Applicant by FlexCon Inc. (Spencer, Mass.) and was tested for stretch-elongation at room temperature. The manufacturer has designated this label as Compucal V400H Clear MT/C-350 V-60691 PRT PFW. Its facestock (V400H) is described as a calendered vinyl. Test results provided by the manufacturer indicated between 150% and 250% elongation before breakage in the MD and the TD.

Samples of this label material were laser-printed and a variety of label sizes and shapes were cut and mounted on vials. These included ⅝ inch square labels and 0.5 inch×1.25 inch rectangular labels that were attached to a series of 1.8 ml capacity polypropylene cryovials (cat. no. 347783 manufactured by Nunc Plastics, Naperville, Ill.) as well as to a series of 1.7 ml capacity polypropylene microcentrifuge tubes with hinged lids (cat. no. 16070 manufactured by Sorenson BioScience, Salt Lake City, Utah). The rectangular labels were dimensionally configured and cut in two directions (MD and TD) orthogonal to one another and applied around the circumference of the vials. Approximately 10 min. after applying the labels, the vials were immersed in liquid nitrogen. After 30 min exposure to liquid nitrogen, the vials were removed and warmed to room temperature. Label peeling was not apparent until the labels had warmed sufficiently to flex away from the sidewalls of the vials. Eight out of eight labels (rectangular and square labels, each label cut in both the machine and transverse directions and applied to both cryovials and microtubes) showed peeling, with between 20% and 60% of the length of each label separated from the vial after the labels had warmed sufficiently to relax and show peeling. While none of the labels fell off the containers, the extent of peeling was considered unsatisfactory. Thus, with these particular labels, failure of the labels (i.e., unsatisfactory peeling) occurred regardless of the orientation of the labels on the cryovials. In spite of the ductility (i.e., approximately 200% elongation) of this label, its hand-feel is somewhat harder (less flexibility and compliance) compared with the soft flex vinyl labels obtained from Emtech Emulsion Technologies, Inc. (see below). It is suspected that the amount of plasticizer used in the Compucal V400H facestock may be too low for this facestock to be useful in the present invention, or perhaps the type of plasticizer is incompatible with adhesion of the label to the cryovials following exposure to liquid nitrogen.

EXAMPLE 2

Laser-Printable Vinyl Labels that Pass Cryogenic Test When Oriented in One Direction on Cryovial Surprisingly, vinyl labels with somewhat reduced elongation before breakage at room temperature, and coated with a somewhat less aggressive waterproof acrylic adhesive (measured by 180 degree peel strength on a polypropylene surface), performed better in cryogenic tests than those labels in Example 1. This was evidenced by the absence of label edge lifting or peeling from polypropylene cryovials and microcentrifuge tubes (identical to those used in Example 1) following immersion in liquid nitrogen. However, Applicant observed that the vinyl facestock material (soft flex PVC) used in these new labels was considerably softer and more compliant than that incorporated into the labels of Example 1. This difference may be attributable to a difference in the amount and/or type of plasticizer used in the PVC. Also, as evidenced below, selecting the correct orientation for placing these vinyl labels on the cryovials relative to the direction of greater elongation of the label proved critical in preventing peeling of the labels following exposure to liquid nitrogen. Vinyl labels used in these tests were manufactured for Applicant by Emtech Emulsion Technologies (a subsidiary of the 3M Company, Medina Ohio). The labels had an overall thickness of 0.0045 inches, consisting of 0.001 inch waterproof permanent tackified acrylic adhesive (P1400) applied to a 0.0035 inch thick matte white soft flex vinyl (PVC) facestock with a top coating that was compatible with diverse methods of machine printing, i.e., computer directed dot matrix printing, laser printing, and thermal transfer printing as well as fixed flexographic printing. The 1.0 mil adhesive coating was protected with an 83 pound release paper liner. The label was designated by the manufacturer as FV02520K or "0.0035 Soft White Vinyl EDP/P1400 Perm. 18/83# Laser TR" The stretch-elongation properties of this label at room temperature were approximately 76% elongation before breakage in the MD and 178% in the TD. The manufacturer informed Applicant that the proprietary chemical plasticizer used in the vinyl facestock is a polymeric plasticizer, and is therefore substantially non-mobile. A sheet of the label material was laser-printed and the same label sizes and shapes were prepared as in Example 1. These were attached to the same series of 1.8 ml capacity polypropylene cryovials and 1.7 ml capacity polypropylene microcentrifuge tubes with hinged lids described in Example 1. Also as above, the rectangular labels were cut in two directions (MD and TD) and applied around the circumference of the vials. Again, after approximately a 10 min. dwell period following application of the labels to the vials, the vials were immersed in liquid nitrogen. After 30 min exposure to liquid nitrogen, the vials were removed and allowed to warm on the lab bench in ambient air.

Results. Upon warming of the vials to room temperature, no label peeling occurred with any of the four labels (square or rectangular) that were applied with the more stretchable TD oriented around the circumference of the vials and microcentrifuge tubes. However, the other four labels (both square and rectangular) that had been applied with the MD (rather than the TD) oriented around the circumference of the vials showed extensive label peeling with approximately ⅓ to ⅔ of the length of the labels detached from the vials. While none of these peeling labels fell off the vials, the extent of label edge lift and peeling was considered unsatisfactory.

Conclusion: It is important that vinyl labels be cut and sized in a manner that allows the label to be applied to cryovials with the direction of greatest elongation before breakage of the label (in this example, the TD) oriented around the container's circumference (or around the perimeter, if the container does not have a round cross section). It is interesting that even square labels share this preferred orientation property with rectangular labels. Indeed, the original hypothesis was that rectangular labels would require greater elongation capability along their length regardless of how they were oriented on a cryovial. The fact that square labels resist peeling when they can elongate more (in this case, the TD orientation of the facestock) around the vial's circumference, suggests that the primary function of vinyl label ductility is to relieve stresses created by differential thermal contraction around the curving circumference of a cryovial exposed to liquid nitrogen. The fast contraction of the label is always expected to cause sheer stress when juxtapositioned with the slower contraction of the vial.

Other Considerations. Applicant has observed that, depending upon the method of manufacture, the TD (aka CD or cross direction) of a pressure sensitive label is not always the direction of greater stretchability. For example, with biaxially oriented label facestocks in which a facestock is stretched first in the MD and second in the TD, the label may show a greater percentage of elongation in the MD because more of the extended polymer molecules are aligned across the web rather than parallel to it. Therefore, it is important to consider actual test results on elongation with a pressure-sensitive label material to determine the direction of greater elongation and therefore which direction it may be preferable to die cut and orient the label on the cryovial. While not wishing to be bound by theory, the ability to elongate or stretch a vinyl facestock in an adhesive label is affected by the alignment of polymer molecules in the facestock. Accordingly, when a pressure-sensitive vinyl label is adhered around a curved circumferential surface of a cryovial and it is chilled rapidly by immersion in liquid nitrogen, the label is forced to contract in length. Given how thin the label is compared to the wall thickness of the vial, the label tends to shrink in linear dimension more rapidly than the wall of the vial. Consequently, to remain attached to the more dimensionally stable wall (during the initial chilling), the label is forced to compensate by stretching and becoming thinner. From Applicant's experiments, it would appear that label elongation around the circumference of the cryovial is more critical than elongation parallel to the axis of the vial. Further explanation for this observation would be speculative.

EXAMPLE 3

Laser-Printable Vinyl Labels that Pass Cryogenic Test when Oriented in Either the MD or the TD Direction on Cryovial Vinyl labels differing from those used in Example 2 only in the type of permanent acrylic adhesive applied during the manufacture of the labels were prepared by Emtech Emulsion Technologies (Medina, Ohio). Instead of applying 1.0 mil of the P1400 adhesive, the manufacturer applied 1.0 mil of P1480 tackified acrylic adhesive. The P1480 adhesive is somewhat softer than P1400, and the peel adhesion tests by the manufacturer (per the standard TLMI Method) showed that adhesion of P1480 (to a standard stainless steel panel) is over twice as great as that of P1400 (5.0 lbs/inch versus 2.2 lbs/inch). Both P1400 and P1480 are recommended by the manufacturer for adhesion to low surface energy plastics such as polypropylene and polyethylene. Since the P1480 adhesive is somewhat softer and more prone to oozing under pressure and/or heat than P1400, it was not recommended by the manufacturer for labels that would be laser printed. Nevertheless, Applicant tested the ability of these vinyl labels with P1480 adhesive to be laser printed (using a Hewlett Packard Laserjet 1200 printer) and encountered no difficulty.

Cryogenic tests were carried out identical to those in Example 2 except that the labels were manufactured with P1480 adhesive rather than P1400. As in Example 2, after a 10 min. dwell period following application of the labels to the vials, the vials were immersed in liquid nitrogen, and after 30 min exposure to liquid nitrogen, the vials were removed and allowed to warm to room temperature in ambient air. Surprisingly, and in contrast to the results in Example 2, no peeling or even edge lift was observed with any of the labels (square and rectangular) regardless of whether the labels were applied with the more stretchable TD (or less stretchable MD) oriented around the circumference of the cryovials and microcentrifuge tubes. Because these results were not anticipated, Applicant repeated the immersion of these same labeled vials and tubes in liquid nitrogen for an additional 30 minutes, warmed them to room temperature, and again examined the labels for peeling. No peeling was observed.

Additional cryogenic container labels were manufactured for Applicant by Emtech Emulsion Technologies and tested under the same cryogenic conditions as described above. These labels were identical to the above except that the soft white vinyl facestock in the labels (designated 0.0035 Soft White Vinyl EDP/P1480 Perm. 18/83# Laser-TR) was replaced by "soft translucent vinyl" to produce translucent labels. The testing results were equivalent to the above (no label lifting or peeling), confirming that either the MD or the TD of the label could be oriented around the circumference of cryovials and microtubes without any harm to the labels.

Conclusion. A somewhat softer and more aggressive, waterproof, tackified acrylic adhesive (e.g., P1480 compared with P1400), can be successfully combined with both opaque and translucent soft flex PVC facestocks manufactured using a non-mobile plasticizer for use as a cryogenic container label. The facestock further includes a waterproof machine print-retaining upper surface. The resulting waterproof printable cryogenic container label will not peel during or after exposure to liquid nitrogen regardless of the mounting, i.e., orientation, of the label on the container relative to the MD and TD of the label material.

According to Applicant's model, during the rapid thermal transition from room temperature to cryogenic temperatures, a rapid volumetric contraction of the facestock of a label occurs (the major proportion of the label being facestock). Since the mass of the label is very small compared to the container to which it is attached, this volumetric contraction occurs much more rapidly for the label than for the container. Therefore, over the time required for the label to freeze and shrink in volume, the container's dimensions will still remain relatively constant. Consequently, the adhesive area originally covered by the label will also remain relatively constant. If the label's facestock is to maintain essentially its original surface area and not split away (i.e., freeze-fracture) from its adhesive as the volume of the facestock is diminishing, the facestock must compensate by stretching horizontally in both length and width, while diminishing in its thickness. Thus, to be useful in the present invention, a thermoplastic label must contain a facestock material which can adequately stretch and become thinner as it cools. These characteristics allow the label facestock material and adhesive material to remain united and connected as they become rigidly frozen into glass-like materials.

To put the above mechanism in perspective, if it were possible for a non-stretchable, (inelastic) label to remain attached to a storage container during cooling to cryogenic temperatures, the area of the label would need to decrease in coordination with the decreasing volume of the label. Given that the container cools slowly compared to the thin label, the area of the container covered by the label remains relatively constant as the label begins contracting in all directions. For the smaller inelastic label to remain attached to the container, the label's adhesive would need to quickly move inwards toward the center of the label without fracturing from either the container or the lower surface of the facestock. Experimental observations indicate that with insufficiently elastic facestocks, fracture will generally occur rather than adhesive migration.

With observations made in the present invention relating to differential elasticity in various vinyl labels, and the retention of these labels on vials exposed to cryogenic temperatures, it may be worthwhile considering differential elongation in other thermoplastic label facestocks when orienting these labels on cryovials for sample identification.

The cryogenic container labels of the present invention require no supplementary over-wrap tape to hold the label on the vial or container, or to preserve the label markings during or following cryogenic storage. If adequately stretchable and waterproof, and provided that the direction of greater elongation in a pressure-sensitive, vinyl facestock label is oriented around the circumference of the container, the label will remain adhered to laboratory storage vials and other containers during and after immersion in liquid nitrogen. This orientation helps in reducing or preventing peeling of the label.

Furthermore, the ability of certain vinyl label materials (which typically have smooth-surfaced thermoplastic facestocks with ink-retaining topcoatings) to be compatible with a variety of printing methods further distinguishes the present invention from cryogenic label materials and label protection tapes that preceded the filing of U.S. Pat. No. 5,836,618 or that are described therein. As discussed above, the earlier vinyl-type pressure-sensitive labels described by Perlman in U.S. Pat. No. 5,836,618 had limited utility as cryogenic container labels. For example, ScotchMark® 7604FP white vinyl label stock, manufactured by the 3M Corporation (3M Identification and Converter Systems Division, St. Paul, Minn.) was found to have limited utility because while the label's top coating could be marked by pencil or ballpoint pen, it could not be printed by the end user with variable information, i.e., could not be computer-printed. In fact, an attempt by Applicant to print this vinyl label in a Hewlett-Packard computer-directed laser printer resulted in the vinyl label material partially melting and jamming the printer. Furthermore, in spite of the highly stretchable nature of the 7604FP material (greater than 100% elongation before breakage in both the machine and transverse directions), the labels experienced unpredictable edge peeling. In fact, sale of cryogenic labels made from the 7604FP product described in U.S. Pat. No. 5,836,618 was terminated by Diversified Biotech, Inc. (Boston, Mass.) in favor of superior Teslin® facestock-containing labels manufactured by the 3M Corporation. For example, pressure-sensitive acrylic adhesive-coated Teslin® facestock-containing labels are fabricated by 3M using 0.007 inch thick Teslin® from PPG Industries (3M#7841 labels). These are highly stretchable in both the direction of roll manufacture, i.e., the MD (570% elongation before breakage) and also the TD (645% elongation before breakage). Not only is this material more stretchable than the earlier 7604FP vinyl labels, but the Teslin® facestock resists much higher temperatures than vinyl. This property facilitates computer-directed laser printing. The porous Teslin® facestock is also compatible with other variable information printing, e.g., computer-directed inkjet and thermal transfer printing, as well as fixed information printing via offset or flexographic printing.

During the preparation of U.S. Pat. No. 5,836,618, Applicant indicated that vinyl facestocks were unsuitable for laser printing. Therefore, it was with considerable surprise that Applicant became aware of laser-printable vinyl labels such as those manufactured by the FlexCon Corporation (Spencer, Mass.). A sample of such labels (known as Compucal V400H Clear MT/C-350 V-606 91PRT PFW) was provided to Applicant who then laser printed the material and tested it for its ability to remain attached to polypropylene cryogenic storage vials and polypropylene microcentrifuge tubes exposed to liquid nitrogen (see Example 1 above). The labels failed to remain attached to these containers.

To be presently useful as a cryogenic container label, sheets or strips of labels are typically die-cut to final size on a paper or plastic carrier/release liner, and each label is typically printed with variable information using a computer-directed printer. This process requires that the facestock material (or top coating on the facestock material) retain any one of a variety of printing inks, toners, and the like, e.g., laser printing, thermal transfer printing, inkjet printing, direct thermal printing, and the like to imprint alphanumeric, bar code, and other information.

It was previously determined that thermoplastic label materials which could be stretched at least 10% in the MD (the direction of label manufacture and spooling) and at least 10% in the TD (perpendicular to the direction of manufacture) without breaking could remain bonded via adhesive materials when attached to a cryogenic storage container and exposed to cryogenic storage conditions. However, even greater stretchability of the facestock can provide further improvements in maintaining the integrity of the facestock/adhesive bond. Therefore, preferably, the facestock can be stretched at least 15%, 25%, 50% or even more in the MD and likewise in the TD. As described herein, the direction of greatest stretch and elongation of the label is oriented in the same direction as the perimeter or circumference of the container.

Thus, in a first aspect, the invention features a method of labeling a cryogenic specimen storage vial, microcentrifuge tube, or other container prior to storage at a cryogenic temperature of about −80 degrees C. or lower. The method includes the steps of:

(a) providing a sized portion of an adhesive vinyl label in which the label includes a waterproof, soft flex vinyl facestock material having a waterproof machine-printable upper surface, a waterproof pressure-sensitive adhesive-coated lower surface, and a removable release liner to protect the adhesive coating. The vinyl facestock material includes a substantially non-mobile plasticizer agent, and the facestock material is capable of being stretched at room temperature at least 10% in both the machine and transverse directions without breaking, (b) printing or marking the upper surface of the facestock to identify the cryogenic storage container and any material within the container. The printing or marking resists ice and moisture that typically condense on the container when it is transferred from cryogenic storage conditions to ambient conditions, (c) removing the release liner from the adhesive-coated lower surface of the facestock, and (d) attaching the sized portion of label to the container.

In a related aspect of this invention, the above providing step further includes providing a sized portion of an adhesive vinyl label having significant elongation asymmetry between the MD and the TD, and the above attaching step includes first orienting the sized portion of label on the cryogenic storage container before attaching it to the container, so that the more stretchable direction of the label is oriented in approximately the same direction as the circumference or perimeter of the container.

Typically an adhesive label is attached to the sidewall surface of a cryogenic storage container, however, it may be attached in other locations, for example on the top.

In a preferred embodiment, the cryogenic storage conditions include exposure to the liquid or vapor phase of liquid nitrogen at a temperature of approximately −196 degrees C.

In another preferred embodiment, the label is fabricated using either a calendered or a cast vinyl facestock material.

In yet another preferred embodiment, the vinyl facestock material includes a polymeric plasticizer agent or agents that are sufficiently non-mobile to prevent significant migration of the plasticizer agents from the facestock material, into the adhesive-coated lower surface of the label.

In another embodiment, the vinyl facestock material is a soft flex vinyl material that can has sufficient ductility to be useful in fabricating pressure-sensitive labels that will not peel from cryovials during and after exposure to cryogenic storage conditions, including exposure to liquid nitrogen.

In another preferred embodiment, the facestock material of the label is capable of being elongated or stretched at room temperature at least 25% in the machine and transverse directions before breaking.

In yet another preferred embodiment, the facestock material of the label is capable of being stretched at room temperature at least 50% in the machine and transverse directions before breaking.

In another preferred embodiment, the upper surface of the facestock material is coated with a top coating material that is receptive to, and retains at least two different types of waterproof marking media.

In another preferred embodiment, the facestock material is between approximately 0.001 inches and 0.010 inches in thickness.

In a related aspect of the invention, the adhesive coating on the lower surface of the facestock material is selected from the group consisting of acrylic and rubber-based adhesives.

In a preferred embodiment, the adhesive coating is between approximately 0.0005 inches and 0.005 inches in thickness.

In another preferred embodiment, the marking of the top coated upper surface of the facestock material is accomplished by a laser printer.

In another preferred embodiment, the marking of the top coated upper surface of the facestock material is accomplished by an ink jet printer.

In another preferred embodiment, the marking of the top coated upper surface of the facestock material is accomplished by a programmable thermal transfer printer or direct thermal printer.

In another preferred embodiment, the marking of the top coated upper surface of the facestock material is accomplished by a manual writing implement selected from the group consisting of a permanent ink marker, pencil, and ballpoint pen.

In a related aspect, the invention features a kit that includes at least one cryogenic storage container, and at least one sized portion of an adhesive label that includes a waterproof vinyl thermoplastic facestock material with a waterproof machine-printable top coated upper surface and a waterproof pressure-sensitive adhesive-coated lower surface, in which the facestock material is capable of being stretched at room temperature at least 10% in the machine direction and at least 10% in the transverse direction before breaking, and in which the sized portion of adhesive label is oriented and attached to the container with the more stretchable direction of the facestock material of the label being oriented in approximately the same direction as the circumference or perimeter of the container, whereby the label can remain united and bonded to the container during and after contact with liquid nitrogen.

In another related aspect, the invention features a kit that includes at least one cryogenic storage container and at least one sized portion of an adhesive vinyl label that includes a waterproof, soft flex vinyl facestock material having a waterproof machine-printable upper surface, a waterproof pressure-sensitive adhesive-coated lower surface, and a removable release liner to protect the adhesive coating. The vinyl facestock material includes a substantially non-mobile plasticizer agent, and the facestock material is capable of being stretched at room temperature at least 10% in both the machine and transverse directions without breaking.

In preferred embodiments of the kits, the upper surface of the waterproof vinyl thermoplastic facestock material includes a machine-printable top coating material selected from the group consisting of laser, ink jet, thermal transfer, direct thermal, and combinations thereof of machine-printable top coating materials.

In another related aspect, the invention features a labeled cryogenic storage vial, that includes a vial constructed of a material suitable for exposure to cryogenic storage conditions having attached thereto a sized portion of an adhesive vinyl label, in which the label includes a waterproof vinyl thermoplastic facestock material with a waterproof markable and machine-printable upper surface and a waterproof pressure-sensitive adhesive-coated lower surface, in which the facestock material is capable of being stretched at room temperature at least 10% in the machine direction and at least 10% in the transverse direction without breaking, and in which the sized portion of adhesive label is oriented and attached to the container with the more stretchable direction of the facestock material of the label being oriented in approximately the same direction as the circumference or perimeter of the container, whereby the facestock and the adhesive can remain united and bonded to the vial during and after contact with liquid nitrogen.

In still another related aspect, the invention features a labeled cryogenic storage vial, that includes a vial constructed of a material suitable for exposure to cryogenic storage conditions having attached thereto a sized portion of an adhesive vinyl label, in which the label includes a waterproof, soft flex vinyl facestock material having a waterproof machine-printable upper surface and a waterproof pressure-sensitive adhesive-coated lower surface. The vinyl facestock material includes a substantially non-mobile plasticizer agent, and the facestock material is capable of being stretched at room temperature at least 10% in both the machine and transverse directions without breaking.

In preferred embodiments of the labeled cryogenic storage vials, the upper surface of the waterproof vinyl thermoplastic facestock material includes a machine-printable top coating material selected from the group consisting of laser, ink jet, thermal transfer, direct thermal, and combinations thereof of machine-printable top coating materials.

In other preferred embodiments of the above kits and labeled cryogenic storage vials, the facestock material is capable of being stretched at room temperature at least 15%, 20%, 50%, or more in the MD and at least 15%, 20%, 50% or more in the TD without breaking; the facestock material is a stretchable vinyl (PVC) facestock material; the facestock material is between approximately 0.001 inches and 0.010 inches in thickness; the adhesive coating on the lower surface of the facestock is selected from the group consisting of acrylic and rubber-based adhesives; the adhesive coating is between approximately 0.0005 inches and 0.005 inches in thickness; and depending upon the selection of different topcoatings for the upper surface of the facestock material, the specimen marking or printing identification can be accomplished by different instruments selected from the group which includes a permanent marking pen, ballpoint pen, pencil, typewriter, computer-directed ink-jet printer, laser printer, thermal transfer printer or direct thermal printer.

As indicated in the Summary above, the present invention involves the identification of thermoplastic label materials which are suitable for use in labeling vials or containers for cryogenic storage without the need for secondary protection of the label surface or a secondary material to provide adhesion during or after the cryogenic storage condition. The invention also includes the identification of differential elongation and/or elastic properties of vinyl label materials in the mutually orthogonal MD and TD whose orientation upon attachment to the wall(s) of a cryogenic storage vial affects the integrity and adhesion of the label during exposure to cryogenic conditions.

As described in U.S. Pat. No. 5,836,618 by Perlman, many different thermoplastic label materials that were tested by attachment to polyethylene and polypropylene cryogenic storage vials, and immersed in liquid nitrogen, failed to remain attached to the vials. In most cases of failure, the lower layer of the label consisting of a high peel-strength acrylic or rubber adhesive, remained attached to the vial while the upper layer(s) of the label, consisting principally of the thermoplastic facestock material (the major structural layer of the label which carries the adhesive), detached from the vial. In occasional cases of failure, the adhesive and the facestock material fractured as a unit from the container.

The test that was used in the present invention to define "cryogenic survival or failure" was the ability of an adhesive labeling material to remain attached to both virgin polyethylene and virgin polypropylene laboratory storage vials without significant edge lifting or peeling during and after immersion in the liquid and the vapor phases of liquid nitrogen at −196 degrees C. In analyzing cryogenic failure of thermoplastic labels with aggressive adhesives, it was found that sometimes the adhesive had fractured away from the vials but remained on the facestock, and other times the facestock had lost its adhesive due to freeze-fracture and transfer of the adhesive to the container. Only after warming to room temperature could the thermoplastic facestock material be re-attached to the container via the transferred adhesive.

Having the above disclosure of the present invention, those skilled in the art will recognized that additional machine-printable vinyl label materials can be identified having characteristics suitable for use in labeling vials or containers for cryogenic storage. Thus, this invention is not limited to the materials disclosed, but includes the use of other materials that have the requisite elongation and adhesion properties.

While the invention has been described with reference to specific embodiments, it will be apparent that improvements and modifications may be made within the purview of the invention without departing from the scope of the invention defined in the appended claims.

What is claimed is:

1. A method of labeling a cryogenic specimen storage container prior to storage at a cryogenic temperature of about −80 degrees C. or lower, said method comprising the steps of:

(a) providing a sized portion of an adhesive vinyl label, wherein said label comprises a waterproof, soft flex vinyl facestock material wherein said vinyl facestock material comprises polyvinyl chloride, having a waterproof machine-printable upper surface, and a waterproof pressure-sensitive adhesive-coated lower surface, wherein said vinyl facestock material comprises a substantially non-mobile plasticizer agent, and said facestock material is capable of being stretched at room temperature at least 10% in both the machine and transverse directions without breaking when subjected to a tensile stress of less than 1200 psi;

(b) marking said upper surface to identify said container, wherein said marking resists ice and moisture that typically condense on said container when it is transferred from cryogenic storage conditions to ambient conditions, and (c) attaching said sized portion of said label to said container.

2. The method of claim 1, wherein the container further comprises a vial, and wherein said providing step further comprises providing a sized portion of an adhesive vinyl label having significant elongation asymmetry between the MD and the TD, and wherein said attaching step comprises first orienting said sized portion of said label on said container before attaching it to said container, so that the a stretchable direction of said label is oriented in approximately the same direction as the circumference.

3. The method of claim 1, wherein said cryogenic storage conditions comprise exposure to the liquid or vapor phase of liquid nitrogen.

4. The method of claim 1, wherein said label comprises a calendered facestock material.

5. The method of claim 1, wherein said label comprises a cast facestock material.

6. The method of claim 1, wherein said vinyl facestock material comprises one or more polymeric plasticizer agents that will not significantly migrate from said facestock material into said adhesive-coated lower surface of said label.

7. The method of claim 1, wherein said facestock material is capable of being stretched at room temperature at least 25% in the machine and transverse directions before breaking when a tensile stress of less than 1200 psi is applied.

8. The method of claim 1, wherein said facestock material is capable of being stretched at room temperature at least 50% in the machine and transverse directions before breaking when a tensile stress of less than 1200 psi is applied.

9. The method of claim 1, wherein said upper surface of said facestock material is coated with a top coating material that is receptive to, and retains waterproof markings.

10. The method of claim 1, wherein said facestock material is between approximately 0.001 inches and 0.010 inches in thickness.

11. The method of claim 1, wherein said marking of said upper surface of said facestock material is accomplished by a laser printer.

12. The method of claim 1, wherein said marking of said upper surface of said facestock material is accomplished by an inkjet printer.

13. The method of claim 1, wherein said marking of said upper surface of said facestock material is accomplished by a thermal transfer printer.

14. The method of claim 1, wherein said marking of said upper surface of said facestock material is accomplished by a direct thermal printer.

15. The method of claim 1, wherein said marking of said upper surface of said facestock material is accomplished by a manual writing implement selected from the group consisting of a permanent ink marker, pencil, and ballpoint pen.

16. The method of claim 1, wherein the adhesive coating on said lower surface of said facestock material is selected from the group consisting of acrylic and rubber-based adhesives.

17. The method of claim 16, wherein said adhesive coating is between approximately 0.0005 inches and 0.005 inches in thickness.

18. A kit comprising at least one cryogenic storage container which is stored at a cryogenic temperature of about −80 degrees C. or lower and at least one sized portion of an adhesive vinyl label, wherein said label comprises a waterproof soft flex vinyl facestock material wherein said vinyl facestock material comprises polyvinyl chloride, having a waterproof machine-printable upper surface, and a waterproof pressure-sensitive adhesive-coated lower surface, wherein said vinyl facestock material comprises a substantially non-mobile plasticizer agent, and said facestock material is capable of being stretched at room temperature at least 10% in both the machine and transverse directions without breaking when a tensile stress of less than 1200 psi is applied.

19. The kit of claim 18, wherein said machine-printable upper surface comprises a top coating material selected from the group consisting of topcoatings for laser printer, for inkjet printer, for thermal transfer printer, for direct thermal printer, and topcoatings suitable for combinations thereof.

20. A labeled cryogenic storage vial, comprising a vial constructed of a material suitable for exposure to cryogenic storage conditions wherein said vial is stored at a cryogenic temperature of about −80 degrees C. or lower, having attached thereto a sized portion of an adhesive vinyl label, wherein said label comprises a waterproof, soft flex vinyl facestock material wherein said vinyl facestock material comprises polyvinyl chloride, having a waterproof machine-printable upper surface, a waterproof pressure-sensitive adhesive-coated lower surface, wherein said vinyl facestock material comprises a substantially non-mobile plasticizer agent, and said facestock material is capable of being stretched at room temperature at least 10% in both the machine and transverse directions without breaking when a tensile stress of less than 1200 psi is applied.

21. The labeled cryogenic storage vial of claim 20, wherein said machine-printable upper surface comprises a top coating material selected from the group consisting of topcoatings for laser printer, for inkjet printer, for thermal transfer printer, for direct thermal printer, and topcoatings suitable for combinations thereof.

22. A method of labeling a cryogenic specimen storage container prior to storage at a cryogenic temperature of about −80 degrees C. or lower, said method comprising the steps of:

(a) providing a sized portion of an adhesive vinyl label, wherein said label comprises a waterproof, soft flex vinyl facestock material wherein said vinyl facestock material comprises polyvinyl chloride, having a waterproof machine-printable upper surface, and a waterproof pressure-sensitive adhesive-coated lower surface, wherein said vinyl facestock material comprises a substantially non-mobile plasticizer agent, and said facestock material is capable of being stretched at room temperature at least 10% in both the machine and transverse directions without breaking when the pressure sensitive adhesive is capable of transferring a tensile force of at least 4 lbs. to the label facestock, (b) marking said upper surface to identify said container, wherein said marking resists ice and moisture that typically condense on said container when it is transferred from cryogenic storage conditions to ambient conditions, and (c) attaching said sized portion of said label to said container.

23. The method of claim 22, wherein the container further comprises a circumference, and wherein said providing step further comprises providing a sized portion of an adhesive vinyl label having significant elongation asymmetry between the MD and the TD, and wherein said attaching step comprises first orienting said sized portion of said label on said container before attaching it to said container, so that the stretchable direction of said label is oriented in approximately the same direction as the circumference.

24. The method of claim 22, wherein said cryogenic storage conditions comprise exposure to the liquid or vapor phase of liquid nitrogen.

25. The method of claim 22, wherein said label comprises a calendered facestock material.

26. The method of claim 22, wherein said label comprises a cast facestock material.

27. The method of claim 22, wherein said vinyl facestock material comprises one or more polymeric plasticizer agents that will not significantly migrate from said facestock material into said adhesive-coated lower surface of said label.

28. The method of claim 22, wherein said facestock material is capable of being stretched at room temperature at least 25% in the machine and transverse directions before breaking when a tensile stress of less than 1200 psi is applied.

29. The method of claim 22, wherein said facestock material is capable of being stretched at room temperature at least 50% in the machine and transverse directions before breaking when a tensile stress of less than 1200 psi is applied.

30. The method of claim 22, wherein said upper surface of said facestock material is coated with a top coating material that is receptive to, and retains waterproof markings.

31. The method of claim 22, wherein said facestock material is between approximately 0.001 inches and 0.010 inches in thickness.

32. The method of claim 22, wherein said marking of said upper surface of said facestock material is accomplished by a laser printer.

33. The method of claim 22, wherein said marking of said upper surface of said facestock material is accomplished by an inkjet printer.

34. The method of claim 22, wherein said marking of said upper surface of said facestock material is accomplished by a thermal transfer printer.

35. The method of claim 22, wherein said marking of said upper surface of said facestock material is accomplished by a direct thermal printer.

36. The method of claim 22, wherein said marking of said upper surface of said facestock material is accomplished by a manual writing implement selected from the group consisting of a permanent ink marker, pencil, and ballpoint pen.

37. The method of claim 22, wherein the adhesive coating on said lower surface of said facestock material is selected from the group consisting of acrylic and rubber-based adhesives.

38. The method of claim 37, wherein said adhesive coating is between approximately 0.0005 inches and 0.005 inches in thickness.

* * * * *